(12) United States Patent
Brady et al.

(10) Patent No.: US 11,580,418 B2
(45) Date of Patent: Feb. 14, 2023

(54) DYNAMICALLY UPDATEABLE RULES ENGINE

(71) Applicant: Phizzle, Inc., San Francisco, CA (US)

(72) Inventors: Ryan Brady, Aurora, CO (US); Michael Patrick, Melville, NY (US); Benjamin Davis, III, San Francisco, CA (US); Edwin J Lau, San Jose, CA (US); James L Whims, Saratoga, CA (US); Stephen Peary, Scottsdale, AZ (US)

(73) Assignee: Phizzle, Inc., San Francisco, CA (US)

( * ) Notice: Subject to any disclaimer, the term of this patent is extended or adjusted under 35 U.S.C. 154(b) by 863 days.

(21) Appl. No.: 16/355,793

(22) Filed: Mar. 17, 2019

(65) Prior Publication Data
US 2020/0293915 A1    Sep. 17, 2020

(51) Int. Cl.
  *G06N 5/04*    (2006.01)
  *G06N 5/025*    (2023.01)

(52) U.S. Cl.
  CPC ............ *G06N 5/025* (2013.01); *G06N 5/04* (2013.01)

(58) Field of Classification Search
  None
  See application file for complete search history.

(56) References Cited

PUBLICATIONS

Smalikho, Co-Evolution of Morphology and Control in Developing Structures, Doctoral Thesis, Technical University Darmstadt, 2017, pp. 1-145 (Year: 2017).*
Cox, Inferring and Exploiting Compact Models of Evolutionary Problem Structure, Doctoral Thesis, University of Southhampton, 2015, pp. 1-162 (Year: 2015).*

* cited by examiner

*Primary Examiner* — Wilbert L Starks
(74) *Attorney, Agent, or Firm* — Key IP Law Group, PLLC

(57) ABSTRACT

A system includes a plurality of sensors; a dynamically updateable rules engine coupled to the plurality of sensors; a data collection management module coupled to the dynamically updateable rules engine and the plurality of sensors; and a data storage and analysis inference module coupled to the data collection management module, the dynamically updateable rules engine and the plurality of sensors. Data from the plurality of sensors that is received by the dynamically updateable rules engine is transformed by the dynamically updateable rules engine by selectively executing rules based on conditions or events. The dynamically updateable rules engine is updated by the data storage and analysis inference module.

20 Claims, 12 Drawing Sheets

DYNAMICALLY UPDATEABLE RULES ENGINE

FIELD OF THE INVENTION

This invention relates, in general, to hardware apparatus for processing Internet of Things (IoT) sensor data optionally through the use of a programmable intelligent machine. More particularly to an apparatus in which users and/or an inference engine specify rules for handling sensor data in such a way that a dynamically updateable rules engine is able to handle a high transaction rate of sensor data in which there are complex rules to handle such data.

BACKGROUND INFORMATION

As the processing power of Internet of Things (IoT) devices has grown, so has the number of applications. An important and growing area of use for these devices is as sensor controllers. The sensors are instruments or virtual instruments (such as cell phones) which are able to detect events and conditions around the sensor. IoT devices (also referred to as Edge Computing Devices) may be used to control and manage sensors, capturing information sent by sensors and directing responses/actions, possibly in real-time, to the sensors or other external machines. By being able to intelligently monitor and react to detailed status (e.g., rotation speed of a lathe), operating conditions (e.g., temperature, humidity, precipitation, etc.) and external events, (e.g., roadway accidents, etc.), IoT devices enable complex processes to be managed more effectively and efficiently in areas as diverse as manufacturing, inventory control, transportation, entertainment, etc.

In many cases, an abundance of data is captured in real time by the sensors. This may require substantial processing by an Edge Computing Device in order to effectively react to the current state of that which is being monitored. Under these circumstances, it is possible that the Edge Computing Devices, being burdened by the complexity of determining the state and appropriate response, may be limited in the rate at which sensor data may be processed.

Moreover, for deployment, environmental and safety reasons, the Edge Computing Devices may not be co-located with the actual sensors. In this case, the sensors deliver their data to the Edge Computing Device via a communication protocol and network. Furthermore, in depth analysis of the data could offer insights (which could be more efficiently processed using computational resources apart from the Edge Computing Devices) that may be useful for more effective management of that which is being monitored. Those resources may reside in or near the Edge Computing Devices and/or externally available over a communication protocol and a public and/or private network.

SUMMARY OF THE INVENTION

The present invention realizes the potential of the using sensors and edge computing devices to collect and process high volumes of information in complex environments through a dynamically updatable rules engine. The invention addresses the issue of transaction processing rate through an apparatus and method which effectively reduces the number of rules that are evaluated by a rules engine.

According to an embodiment of the present disclosure, a machine comprises: a plurality of sensors; a dynamically updateable rules engine coupled to the plurality of sensors; a data collection management module coupled to the dynamically updateable rules engine and the plurality of sensors; and a data storage and analysis inference module coupled to the data collection management module, the dynamically updateable rules engine and the plurality of sensors, wherein data from the plurality of sensors that is received by the dynamically updateable rules engine is transformed by the dynamically updateable rules engine by selectively executing rules based on conditions or events and wherein the dynamically updateable rules engine is updated by the data storage and analysis inference module.

According to another embodiment of the present disclosure, a process comprises: operating a sensor system including receiving data from a plurality of sensors using a dynamically updateable rules engine that is coupled to the plurality of sensors; processing the received data using the dynamically updateable rules engine by selectively executing rules based on conditions or events; transmitting the processed data from the dynamically updateable rules engine to a data collection management component that is coupled to the dynamically updateable rules engine and the plurality of sensors; and updating dynamically the dynamically updateable rules engine using a data storage and analysis inference module that is coupled to the dynamically updateable rules engine, the dynamically updateable rules engine and the plurality of sensors.

BRIEF DESCRIPTION OF THE DRAWINGS

The drawings accompanying and forming part of this specification are included to depict certain embodiments of the present disclosure. A clearer concept of the embodiments described in this application will be readily apparent by referring to the exemplary, and therefore nonlimiting, embodiments illustrated in the drawings (wherein identical reference numerals (if they occur in more than one view) designate the same elements). The described embodiments may be better understood by reference to one or more of these drawings in combination with the following description.

DETAILED DESCRIPTION OF PREFERRED EMBODIMENTS

Figure 1:
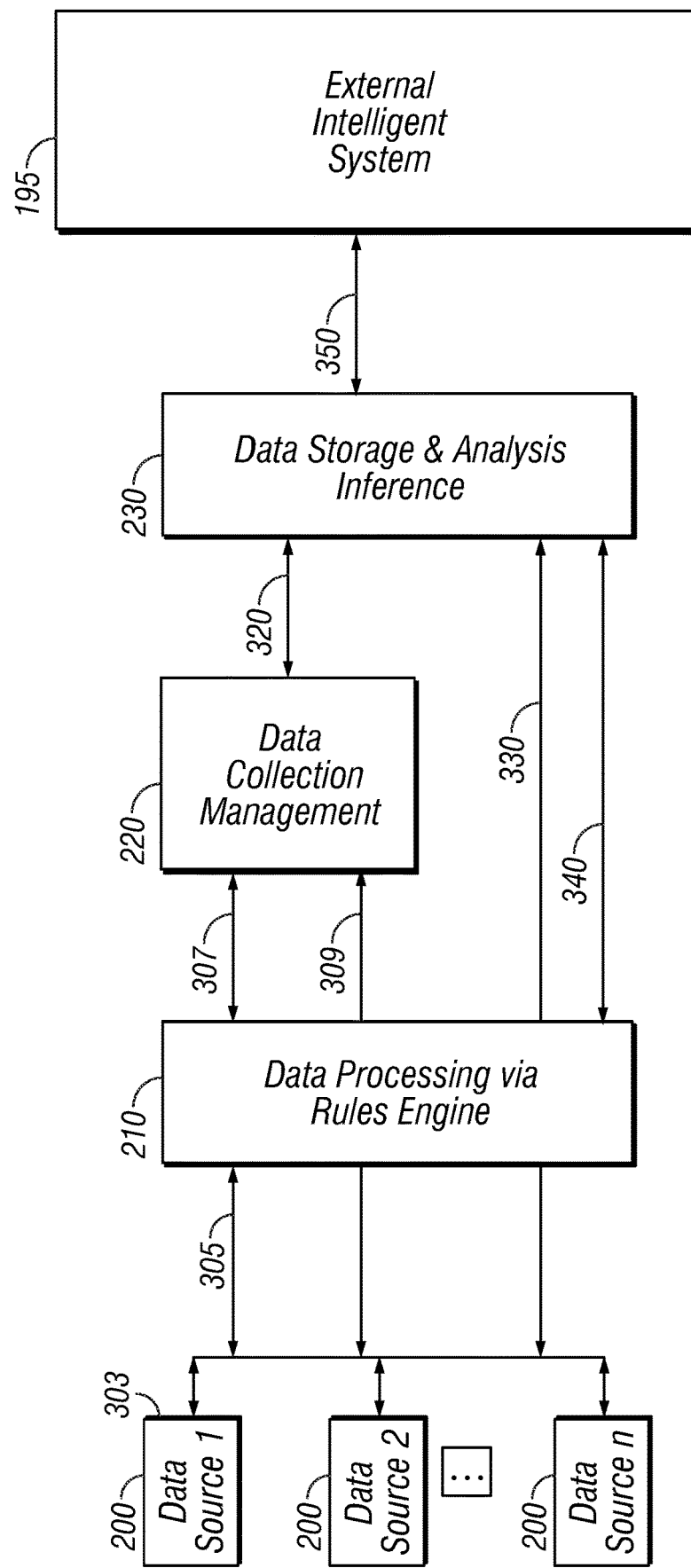
FIG. 1 is block schematic diagram of various elements associated with the invention.

FIG. 1 is a diagram of various elements associated with the invention. Data sources 1-n corresponding to a plurality of dependent or independent sensors 200, dynamically updateable rules engine 210, data collection management module 220, a data storage and analysis inference component 230 and an external intelligent system 195 are all coupled together. These elements in different co-located connected combinations and/or separately located coupled combinations make up the primary components of the various preferred embodiments of the invention. The data sources 1 to n corresponding to a plurality of dependent or independent sensors 200 are coupled together via a bidirectional communication link and protocol 303.

A data source 1 to n including one of the plurality of dependent or independent sensors 200 can communicate via a bidirectional communication link and protocol 303 and a bidirectional communication link and protocol 305 to dynamically updateable rules engine 210. The dynamically updateable rules engine can communicate via bidirectional communication link and protocol 307 to data collection management module 220.

A sensor data processing apparatus in accordance with the invention can be divided into five components: the data sources 1 to n corresponding to a plurality of dependent or independent sensors 200, the dynamically updateable rules engine 210, the collection management module 220, the data storage and analysis inference component 230, and the external intelligent system 195 as illustrated in FIG. 1.

The sensor data processing apparatus is initialized and may be updated through a user interface where system administrators define the format of the data (including the fields and ranges within the data), the rules for processing the data, and actions associated with the rules. The updating can be periodical. The updating may be performed automatically as a result of changes in the frequency of occurrence or changes in the range of fields detected by the sensors and/or by the modification/addition of rules derived by the intelligent analysis of historical sensor data and rules.

Figure 2A:
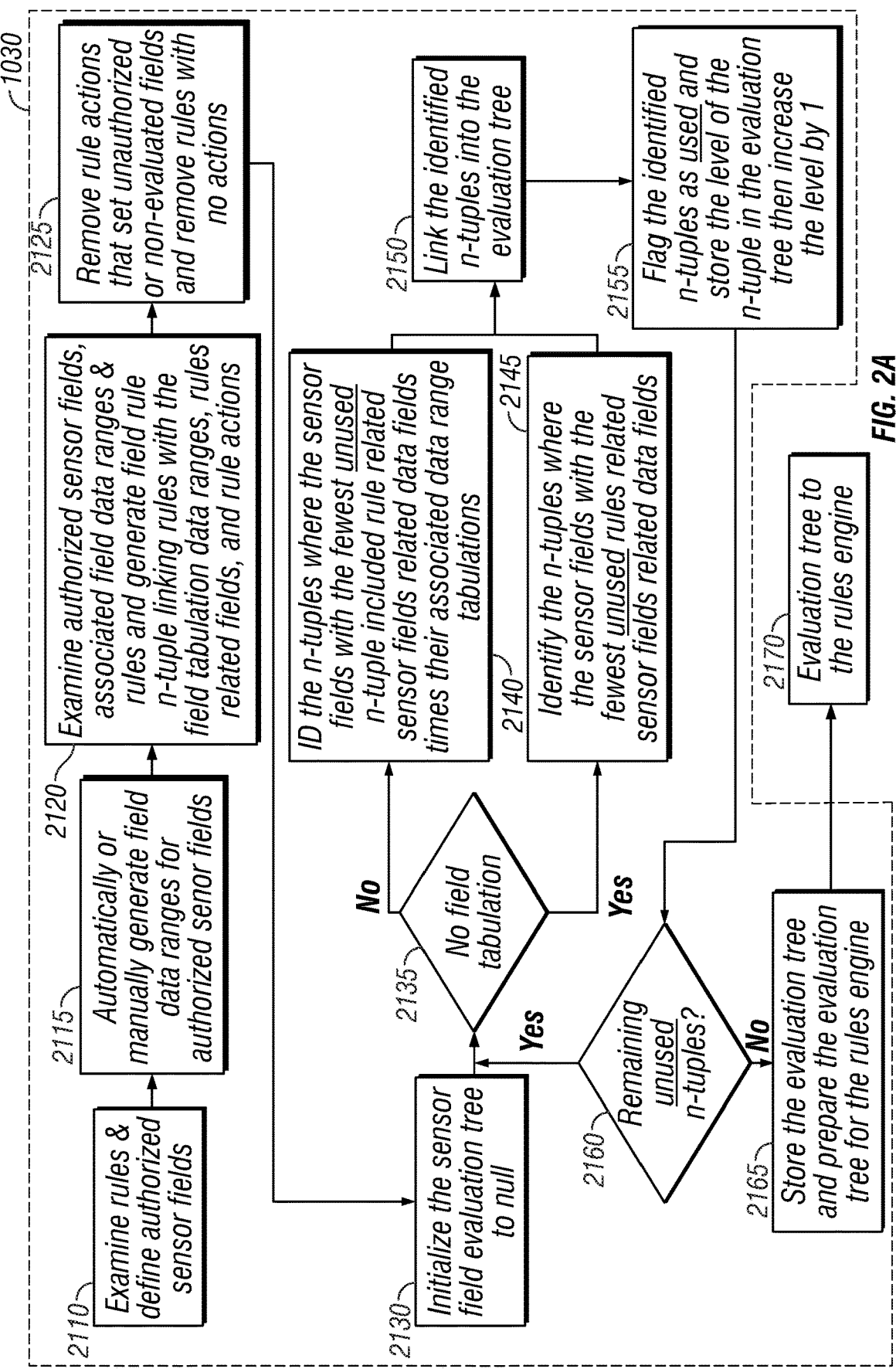
FIG. 2A is a flow diagram of a process that can be implemented by a computer program associated with the apparatus shown in FIGS. 4-9.

FIG. 2A illustrates a process 1030 whereby data collection management module 220 initializes and updates the rules for evaluation by dynamically updateable rules engine 210. This FIG. 2A is associated with data collection management module 220 of the apparatus shown in FIGS. 4-9 and represents a detailed independent description of the process 1030 within data collection management module 220.

Specifically, to initialize or update the sensor data processing apparatus, rules are examined and authorized fields within data returned by sensors are defined 2110. With each authorized field, data ranges are initially set manually or automatically 2115. Automatic ranges may be set if there is historical data associated with the field and the ranges or if there default range values specified for the field. For each authorized field, a field n-tuple is created linking the field with the rules and rules actions that are associated with the field as well as other fields which may also be evaluated with the aforementioned rules 2120. The other fields may define evaluation priorities, weights, or even define functions to be performed or utilized when encountering the specific authorized field. Rules that set or utilize unauthorized fields or have no associated actions are flagged as such or removed 2125. This is followed by steps 2130, 2135. The n-tuples are evaluated and organized 2140 and 2145, associating sensor field n-tuples with other sensor field n-tuples of the same complexity with one another 2150. The field n-tuple complexity for a sensor field is equal to the number of other field n-tuples included in rules related sensor fields not counting those sensor fields already evaluated and organized. The complexity value may also include the historical tabulation of the field data ranges (e.g., a historical histogram of the occurrence of the data ranges for a field). The n-tuples of fields with the same complexity are grouped together 2155. This is followed by step 2160. The groupings are ordered into a prioritized evaluation tree from the least complex to the most complex groupings 2165. The prioritized evaluation tree is utilized by a dynamically updateable rules engine 210, organized and optimized for a specific or a number of conditions including lowest peak utilization, speed, etc. with only rules that matter for a specific environment accounting for frequency of sensor field occurrence 2170. An implementation of this process is shown in FIG. 2A.

Figure 3:
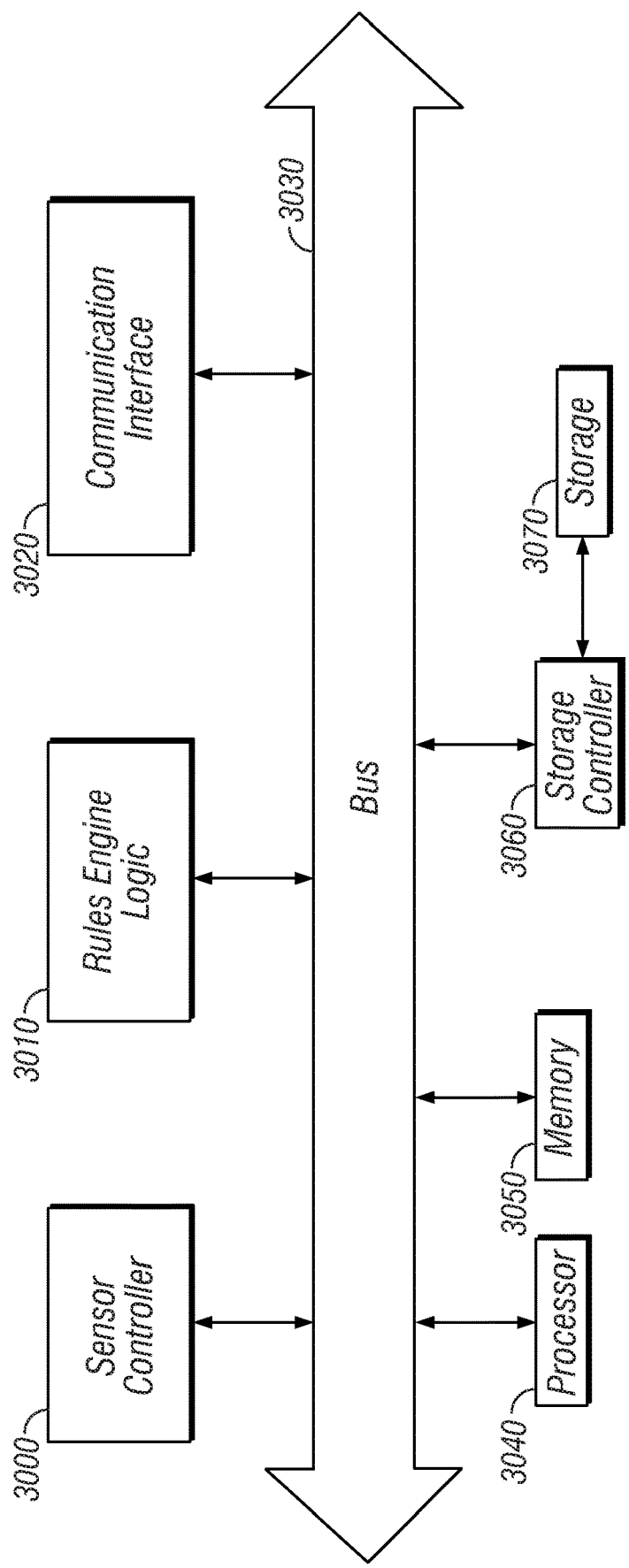
FIG. 3 is a block schematic diagram of the dynamically updateable rules engine hardware components associated with the data processing via rules engine shown in FIGS. 4-9.

Moreover, the prioritized evaluation tree may be processed such that is described in a programming language such as C and/or a hardware description language (HDL) such as Verilog or VHDL and loaded into rules engine logic 3010 in FIG. 3. The prioritized evaluation tree represented as a programming language may be delivered as such or as a compiled binary. The compiled binary representation would result in the prioritized evaluation tree being loaded into memory 3050 in FIG. 3. Memory 3050 could be volatile (e.g., DRAM) and/or non-volatile (e.g., PROM, EPROM, and EEPROM) memory. The HDL representations of the prioritized evaluation tree enable the use of field-programmable gate arrays (FPGAs) from vendors such as Altera and Xilinx within dynamically updateable rules engine 210 such that the rules processing is performed using FPGAs. The HDL representation would result in the prioritized evaluation tree being loaded into dynamically updateable rules engine logic 3010 in FIG. 3.

Figure 2B:
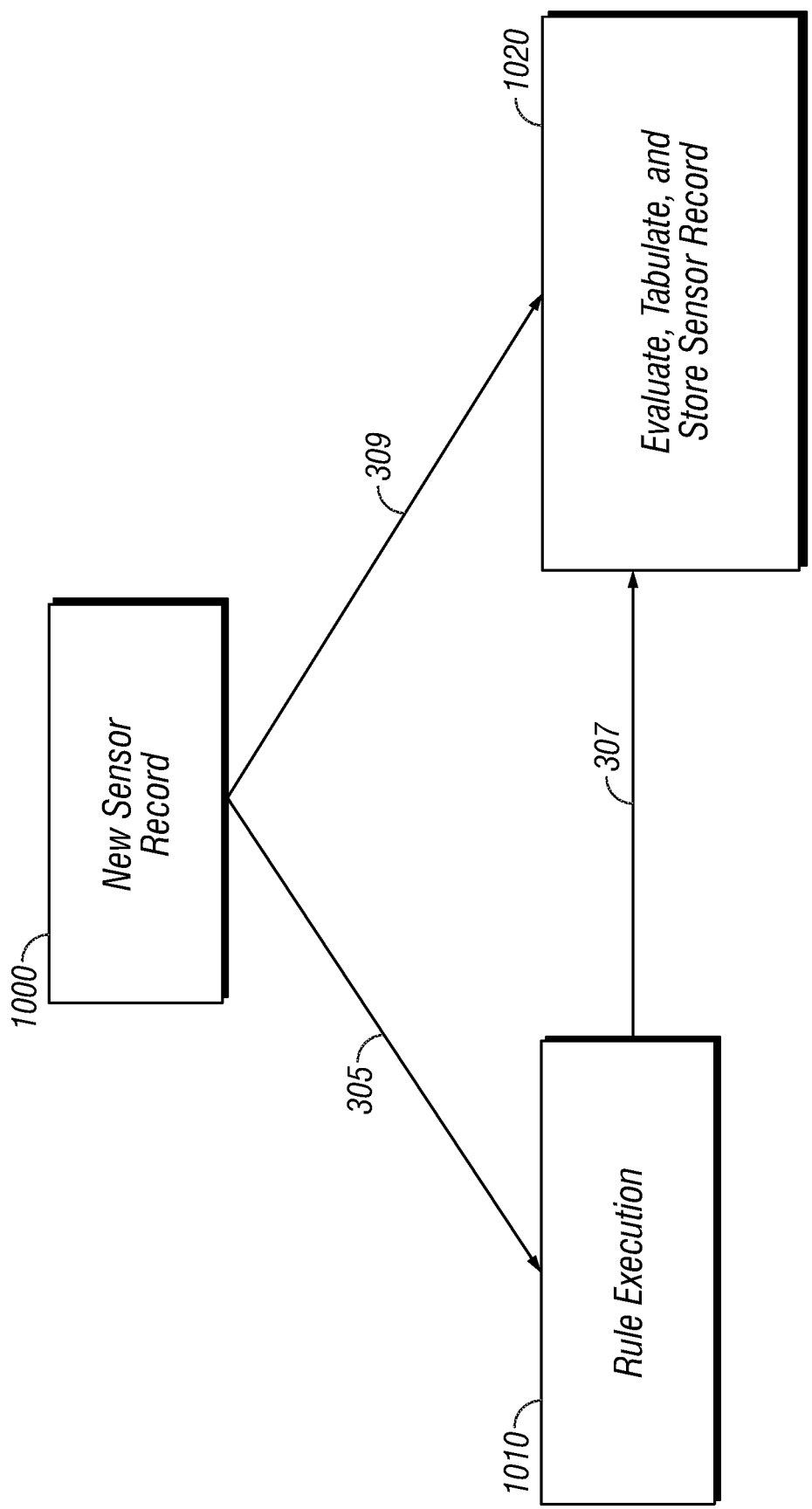
FIG. 2B is a flow diagram of a process that can be implemented by a computer program associated with the apparatus shown in FIGS. 4-9.

FIG. 2B illustrates a process where a new sensor record 1000 from the plurality dependent or independent sensors 200 is delivered to both the dynamically updateable rules engine 210 and the data collection management module 220. This FIG. 2B is associated with the apparatus shown in FIGS. 4-9. After the sensor data processing apparatus has been initialized, each sensor (from the plurality of dependent or independent sensors 200), upon detecting an event, communicates the information about the event to generate a new sensor record 1000, identifying itself (e.g., unique sensor ID, make and model of sensor, device, and/or instrument, etc.), the event (e.g., a post on the social media application Twitter to particular handle, the entry of an automobile onto a specific segment of a highway, etc.), and other data (e.g., the content of the tweet, or the road conditions, weather conditions). Still referring to FIG. 2B, this communication of new sensor record 1000 goes to both 210 and 220, but it is important to appreciate that the route to 220 can be either A) directly to 220 along 309 or B) indirectly to 220 by first along 305 to 210 and then second along 307 from 210 to 220. An implementation of this process is shown in FIG. 2B.

Figure 2C:
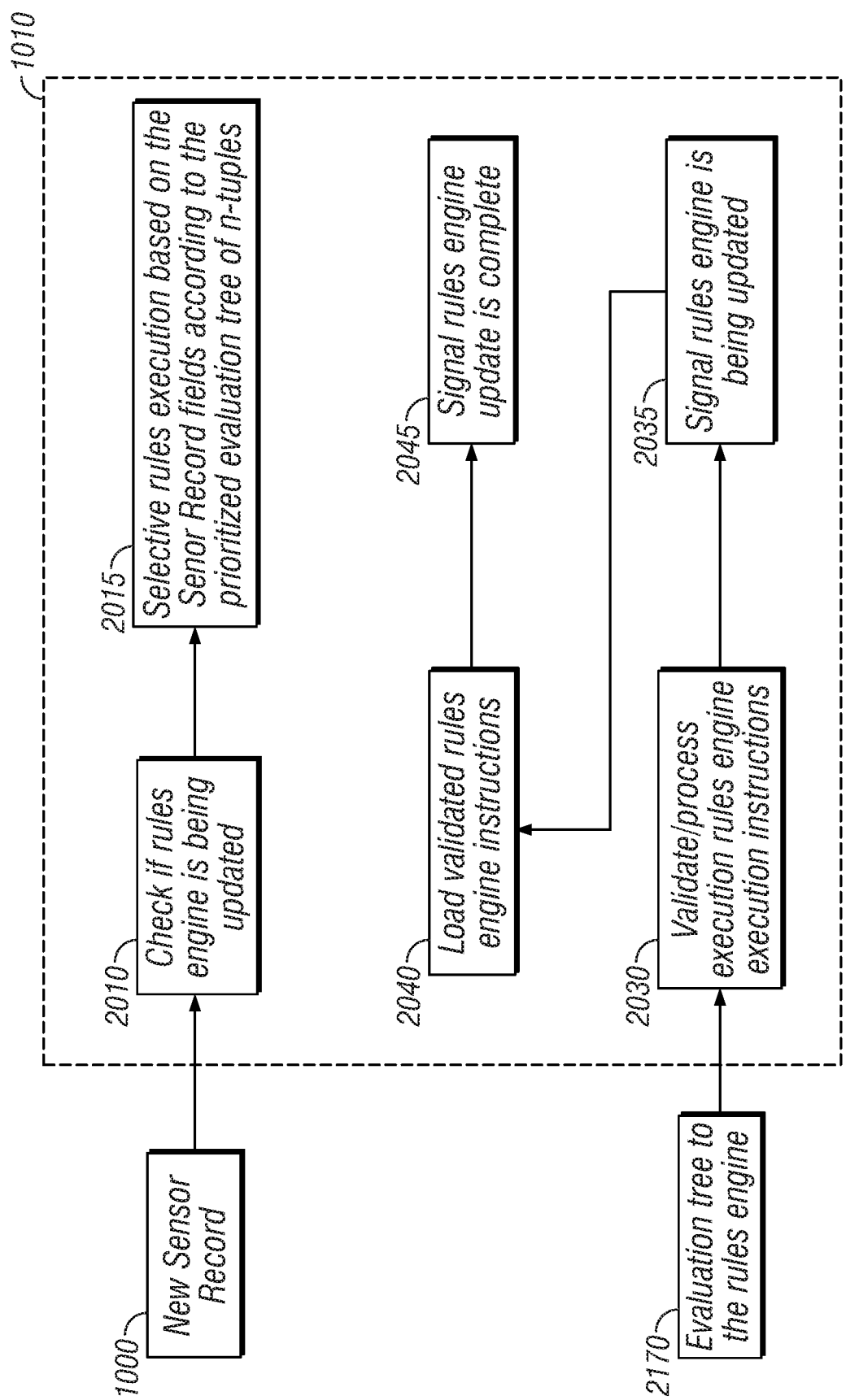
FIG. 2C is a flow diagram of a process that can be implemented by a computer program associated with the apparatus shown in FIGS. 4-9.

FIG. 2C illustrates a process 1010 whereby dynamically updateable rules engine 210 evaluates a new sensor record 1000 from a plurality of dependent or independent sensors 200. Additionally, FIG. 2C shows a process whereby dynamically updateable rules engine 210 handles updated rules for dynamically updateable rules engine 210. This FIG. 2C is associated with dynamically updateable rules engine 210 of the apparatus shown in FIGS. 4-9 and depicts a detailed process for the rule (evaluation and) execution process 1010 in FIG. 2B.

Upon receiving a new sensor record 1000, dynamically updateable rules engine 210 inspects the data fields of the sensor record and performs the tasks as defined by the rules. More specifically, the dynamically updateable rules engine 210 first determines if the rules (for dynamically updateable rules engine 210) are being updated 2010. If the dynamically updateable rules engine is being updated, it may wait until the update is complete before executing the defined tasks or note the update (including the date and time stamp) and then perform the tasks as dictated by the pre-updated rules. The dynamically updateable rules engine 210 will execute the rules based on, the sensor record fields 2015 according to a prioritized evaluation tree 2170 (FIG. 2A). Moreover, upon receiving a new form of prioritized evaluation tree 2170, the dynamically updateable rules engine 210 validates/processes the prioritized evaluation tree 2030, signals the dynamically updateable rules engine is being updated 2035, and loads the validated form of prioritized evaluation tree 2040. This is followed by signaling that the rules engine update is complete. An implementation of this process is shown in FIG. 2C.

The prioritized evaluation tree 2170 may be passed to the dynamically updateable rules engine 210 as 1) a group of linked n-tuples from data collection management module 220, 2) as source for a computer program, 3) a compiled binary executable by a processor within dynamically updateable rules engine 210, and/or 4) as binary HDL. Case 1) the linked n-tuple is loaded into volatile or non-volatile memory for subsequent interpretation by the program running in dynamically updateable rules engine 210; or compiled into an executable binary and loaded into volatile or non-volatile memory and executed by processor in dynamically updateable rules engine 210; or compiled into binary HDL where it is loaded and executed directly as an FPGA within the Dynamically updateable rules engine 210. Case 2) the source is compiled into an executable binary to be loaded into volatile or non-volatile memory executed by a processor in dynamically updateable rules engine 210; or compiled into binary HDL where it is loaded and executed as an FPGA within the dynamically updateable rules engine 210. Case 3) the compiled binary is loaded into volatile or non-volatile and executed by a processor in dynamically updateable rules engine 210. Case 4) the binary HDL is loaded and executed as an FPGA within the dynamically updateable rules engine 210. Cases 1)-4) occur as part of step 2030 in FIG. 2C.

The data collection management module 220 can further communicate via bidirectional communication link and protocol 320 the sensor data to data storage and analysis inference component 230, where the raw information is stored and analyzed as shown in FIG. 1.

Figure 2D:
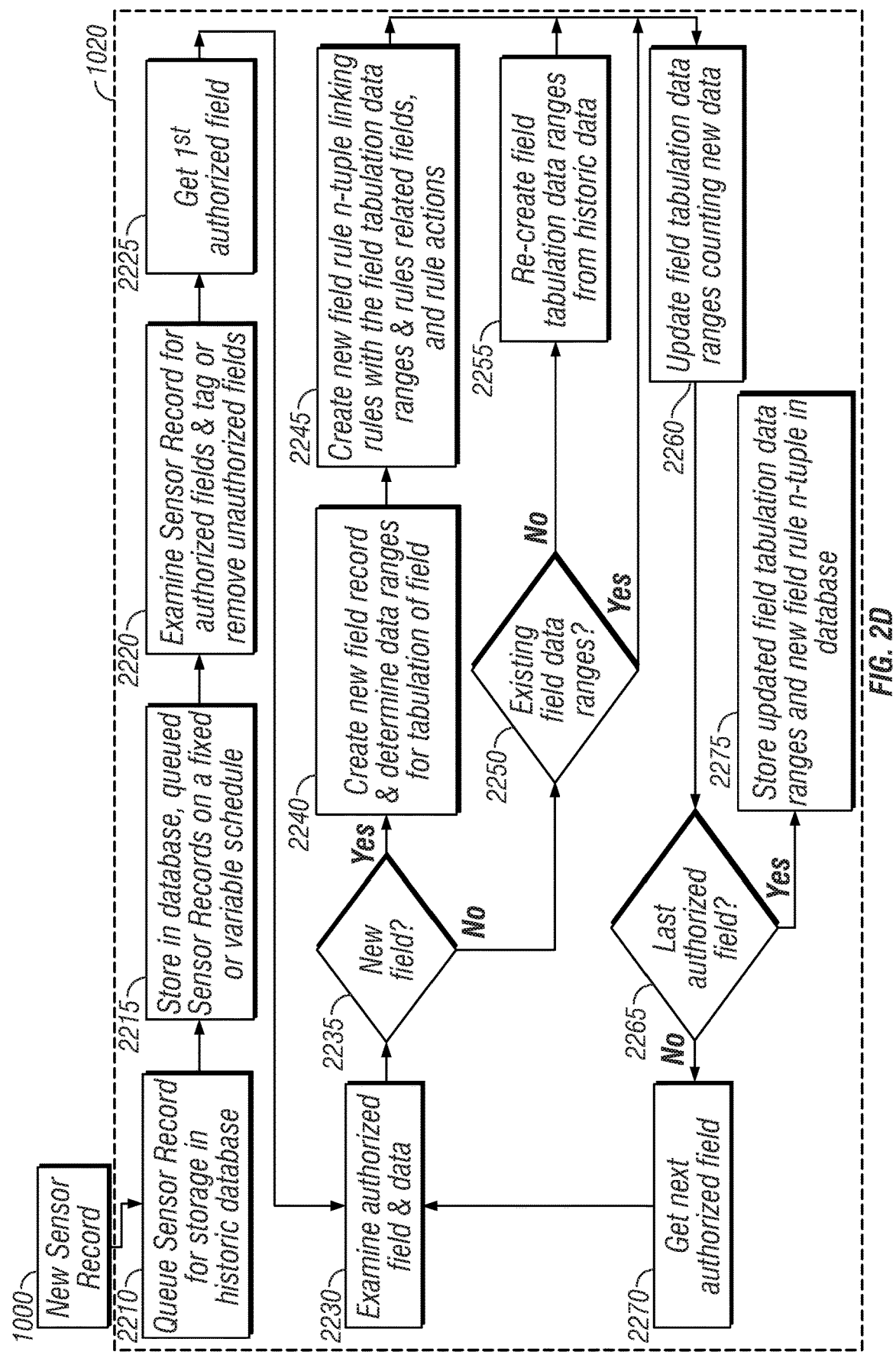
FIG. 2D is a flow diagram of a process that can be implemented by a computer program associated with the apparatus shown in FIGS. 4-9.

FIG. 2D illustrates a process 1020 whereby data collection management module 220 evaluates a new sensor record 1000 from a plurality of dependent or independent sensors 200. This FIG. 2D is associated with data collection management module 220 of the apparatus shown in FIGS. 4-9 and depicts a detailed process for the evaluate, tabulate and store sensor record process 1020 in FIG. 2B.

Upon receiving a new sensor record 1000, data storage and analysis inference component 230, queues the new sensor record for storage in a historical database 2210. Storage of the queued records may be performed on a fixed or variable schedule 2215. The variable schedule may be determined automatically by the rate of record arrival and the speed of writing to storage with the goal of preserving sufficient memory to queue the records. The fixed schedule may be configured through a user interface where system administrators specify the schedule. After the new sensor record 1000 is queued for storage, the data within the record is examined. Only fields which have been authorized are processed 2220. The authorized fields may be configured through a user interface where system administrators specify the authorized fields. For each authorized field, first determine if the field is new. (A field is new when it is newly authorized by a system administrator.) If the field is new, a new field record is created including the data ranges of the field based on historical data or configured through a user interface where system administrators specify the data ranges 2240. Moreover, the new field record includes a count of the times a data range has been encountered and may also include a weight associated with the data range. (The data range weight may be configured through the user interface or automatically through an inference engine process within Data Storage and Analysis Inference component 230.) Following the creation of the new field record, a new field n-tuple is created that links the new field with the rules and rules actions that are associated with the new field and other fields which are evaluated with the rules 2245. If the field exists, the value of the field is compared with the associated field record to determine if the field is within the existing range 2250. If the field is out of the existing range, a new field range is created including the new data and historical data 2255. The new field range record count is updated 2260. This is followed by step 2265 and step 2270. After the final field of the New Sensor Record 1000 is processed, the field record and the associated field n-tuple are stored in a database 2275 located within Data Storage and Analysis Inference component 230. An embodiment of this process is shown in FIG. 2D.

Data Storage and Analysis Inference component 230 may communicate with the External Intelligent System 195 which can include computers on a private local area network, public or private cloud service and/or the Internet. Given access to the collected sensor data and rules, the External Intelligent System 195 may provide additional data and insights on the stream of sensor data. New rules may be automatically generated by Data Storage and Analysis Inference component 230 (for dynamically updateable rules engine 210) that include insights from the External Intelligent System 195. Furthermore, new rules may be automatically generated by the External Intelligent System 195 alone and communicated to Data Storage and Analysis Inference component 230. These processes can be a part of the External Intelligent System 195 identified in the various preferred embodiments disclosed in FIGS. 4-9.

FIG. 3 is a diagram of hardware components associated with the dynamically updateable rules engine 210 in FIGS. 4-9. A sensor controller 3000 is coupled to a bus 3030. A rules engine logic circuit is coupled to the bus 3030. The rules engine logic circuit 3010 can include a field programmable gate array. The rules engine logic circuit can include a hardware description language (HDL) prioritized evaluation tree. A communication interface 3020 is coupled to the bus 3030. A processor 3040 is coupled to the bus 3030. A memory 3050 is coupled to the bus 3030. The memory 3050 can include a compiled binary prioritized evaluation tree. A storage controller 3060 is coupled to the bus 3030. A storage device 3070 is coupled to the storage controller 3060. Of course, dynamically updateable rules engine 210 is not limited to the embodiment shown in this FIG. 3 and is open to other hardware components, fewer hardware components and/or other coupling configurations of those components.

Figure 4:
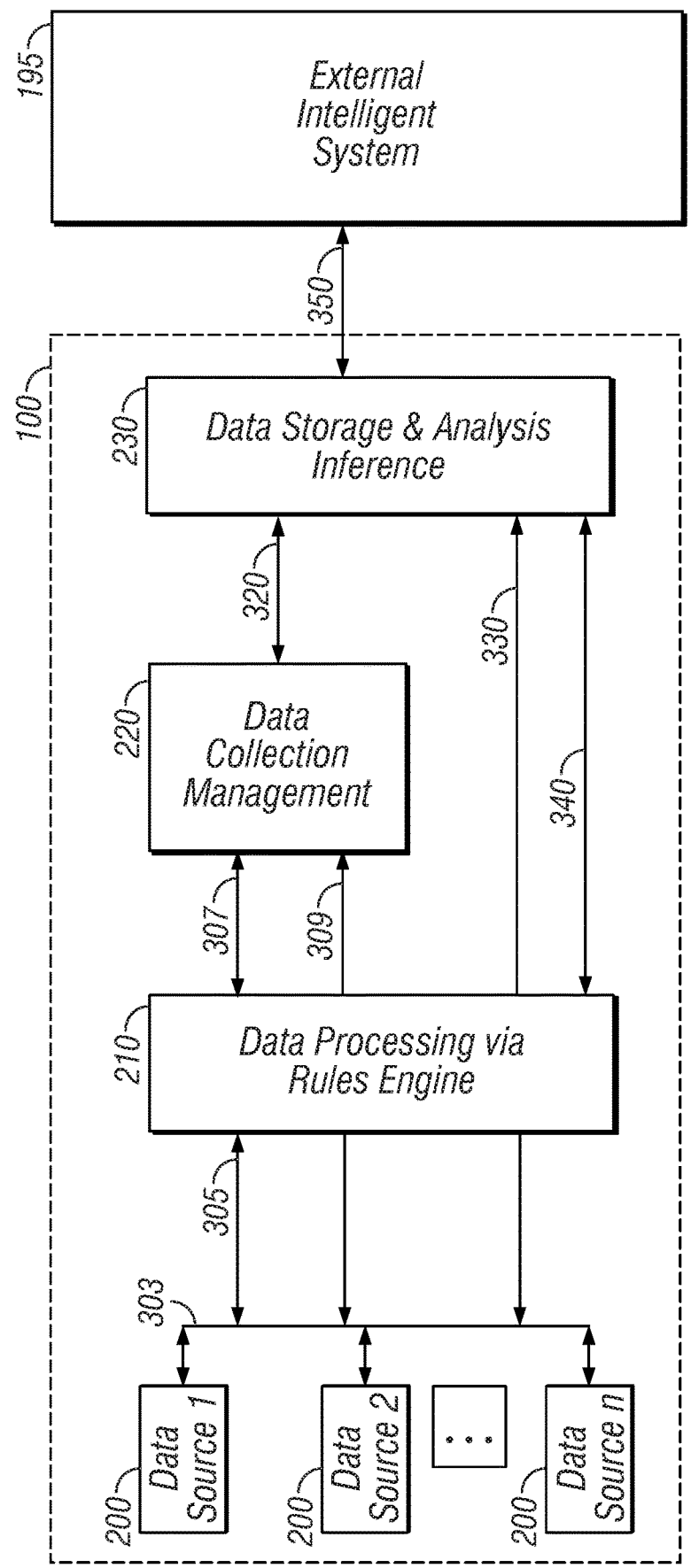
FIG. 4 is a block schematic diagram of a first embodiment of the invention.

FIG. 4 is a diagram of a first embodiment of the invention. A sensor rules processing management storage inference apparatus 100 is coupled to an external intelligent system 195. The sensor rules processing management storage inference apparatus includes a plurality of data sources 1 to n including dependent or independent sensors 200, dynamically updateable rules engine 210, data collection management module 220 and a data storage and analysis inference component 230.

Still referring to FIG. 4, in this first embodiment of the invention, the sensor rules processing management storage inference apparatus 100 includes 1) a plurality of dependent or independent sensors 200, 2) a dynamically updateable rules engine 210 for processing data collected by the sensors, 3) a data collection management module 220, and 4) a data storage and analysis inference component 230 that a) stores and analyses the data being collected by the sensors according to the rules as evaluated by the dynamically updateable rules engine, b) communicates reflexively to an individual, the system manager, informing current status and/or prompting for manual actions including new rules and/or rule evaluation sequences of existing rules for the dynamic update of the rules engine and the data model and c) infers new actions including new rules and/or new rule evaluation sequences of existing rules such that the new rules or rule sequences may be downloaded and dynamically update the rules engine.

Referring to FIGS. 4-9, an optional, separate external intelligent system 195 that may provide stored or derived data can be connected to the sensor apparatus via a high speed network where the external intelligent system may provide data including but not limited to within parameter bounds, sampling rates and/or stability criterion which may be utilized by the Data Storage and Analysis Inference component 230. The dependent or independent sensors may be virtual sensors and/or real sensors.

Referring again to FIG. 4, the elements including Data Sources 1 to n including a plurality of dependent or independent sensors 200, dynamically updateable rules engine 210, Data Collection Management module 220, and Data Storage and Analysis Inference component 230 are included in a single system Sensor Rules Processing Management Storage Inference Apparatus 100. External Intelligent System 195 is external to Sensor Rules Processing Management Storage Inference Apparatus 100 and communication between the two is made via a bidirectional communication link and protocol 350. For efficiency, bidirectional communication link and protocol 350 may be over a high speed wire including coaxial cable, multi wire such as Ethernet or fiber optics. The bidirectional communication link and protocol 350 can be wireless including 802.11 (WiFi). 802.15 (5G), or other high speed protocol.

The bidirectional communication link and protocol 350 can be made using protocols such as TCP/IP, UDP, etc. Access to functions between Sensor Rules Processing Management Storage Inference Apparatus 100 and the External Intelligent System 195 will be made in the most efficient manner including Application Programming Interface (API) calls or Web Services and Representation State Transfer (REST) interfaces accessible on the Internet enable access to the External Services and Data by Web applications also located on the Internet. Access to such Web Services can require authorization and authentication.

Figure 5:
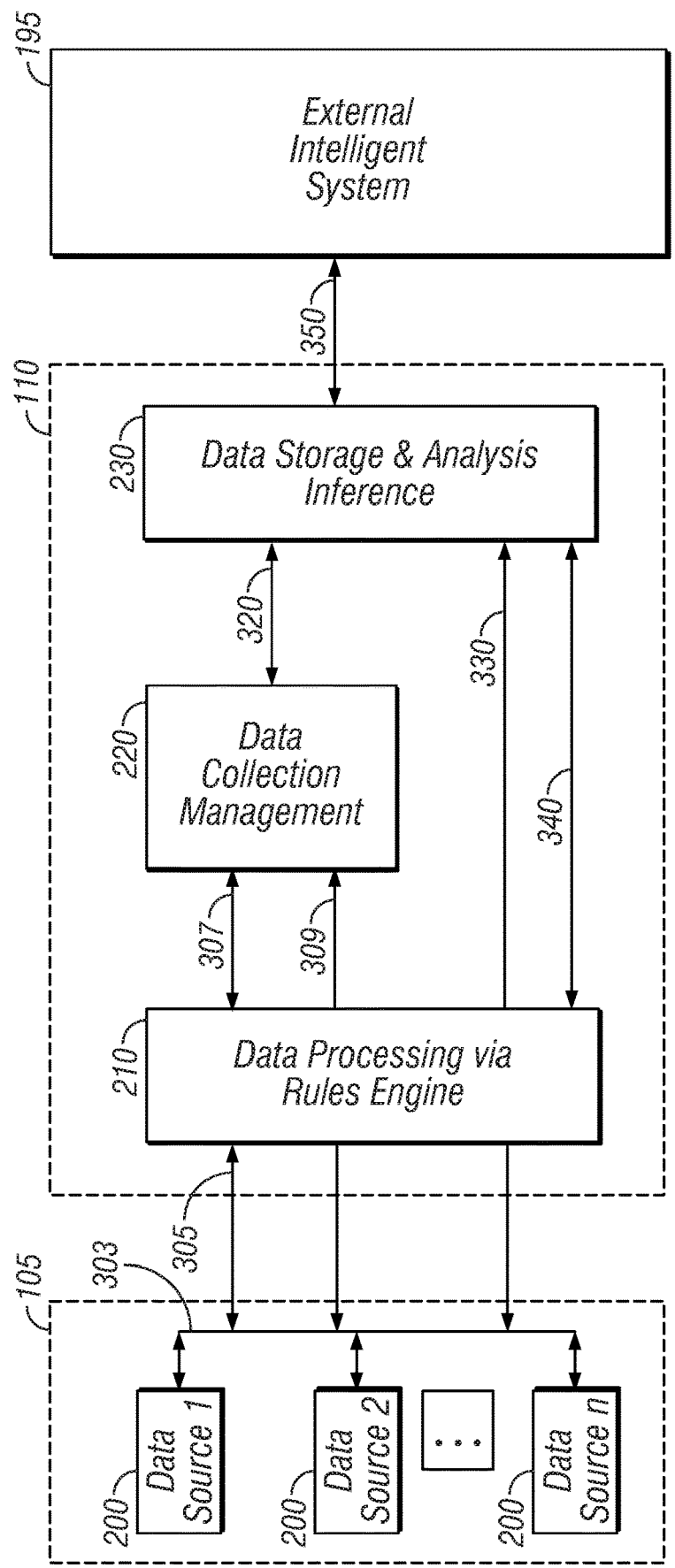
FIG. 5 is a block schematic diagram of a second embodiment of the invention.

FIG. 5 is a diagram of a second embodiment of the invention. A sensor apparatus 105, a rules processing management storage inference apparatus 110 and an external intelligent system 195 are all coupled together. The Sensor Apparatus 105 includes a plurality of dependent or independent sensors 200. The rules processing management storage inference apparatus 110 includes dynamically updateable rules engine 210, data collection management module 220 and data storage and analysis inference component 230.

Still referring to FIG. 5, in this second embodiment of the invention, the sensor apparatus 105 includes a plurality of dependent or independent sensors 200 connected via a communication network to separate rules processing management storage inference apparatus 110. The rules processing management storage inference apparatus 110 is made up of 1) a dynamically updateable rules engine 210 processing data collected by the sensors. 2) a data collection management module 220 and 3) a data storage and analysis inference component 230 that a) stores and analyses the data being collected by the sensors according to the rules evaluated by the dynamically updateable rules engine, b) communicates reflexively to an individual, the system manager, informing current status and/or prompting for manual actions including new rules and/or rule evaluation sequences of existing rules for the dynamic update of the rules engine, and/or c) infers new actions including new rules and/or new rule evaluation sequences of existing rules such that the new rules or rule sequences may be downloaded and dynamically update the rules engine.

In the second embodiment illustrated in FIG. 5, the elements including dynamically updateable rules engine 210, Data Collection Management module 220, and Data Storage and Analysis Inference component 230 are included in a single system Rules Processing Management Storage Inference Apparatus 110. The Data Sources 1 to n including a plurality of dependent or independent sensors are part of the independent Sensor Apparatus 105 communicating to Rules Processing Management Storage inference Apparatus 110 through a bidirectional communication link and protocol 305, 309, 330. The External Intelligent System 195 is external to Rules Processing Management Storage Inference Apparatus 110 and communicates through bidirectional communication link and protocol 350 in the manner described in FIG. 4.

Bidirectional communication links 305, 309, 330 may be over a high speed wire including coaxial cable, multi wire such as Ethernet or fiber optics. The communication links 305, 309, 330 can be wireless including 802.11 (WiFi), 802.15 (5G), or other high speed protocol.

The bidirectional communication protocol of links 305, 309, 330 can be made in the most efficient manner including Message Queuing Telemetry Transport (MQTT), Advanced Message Queuing Protocol (AMQP), Streaming Text Oriented Messaging Protocol (STOMP), the IETF Constrained Application Protocol, Extensible Messaging and Presence Protocol (XMPP), Data Distribution Services (DDS), OPC Unified Architecture (UA), and Web Application Messaging Protocol (WAMP).

Figure 6:
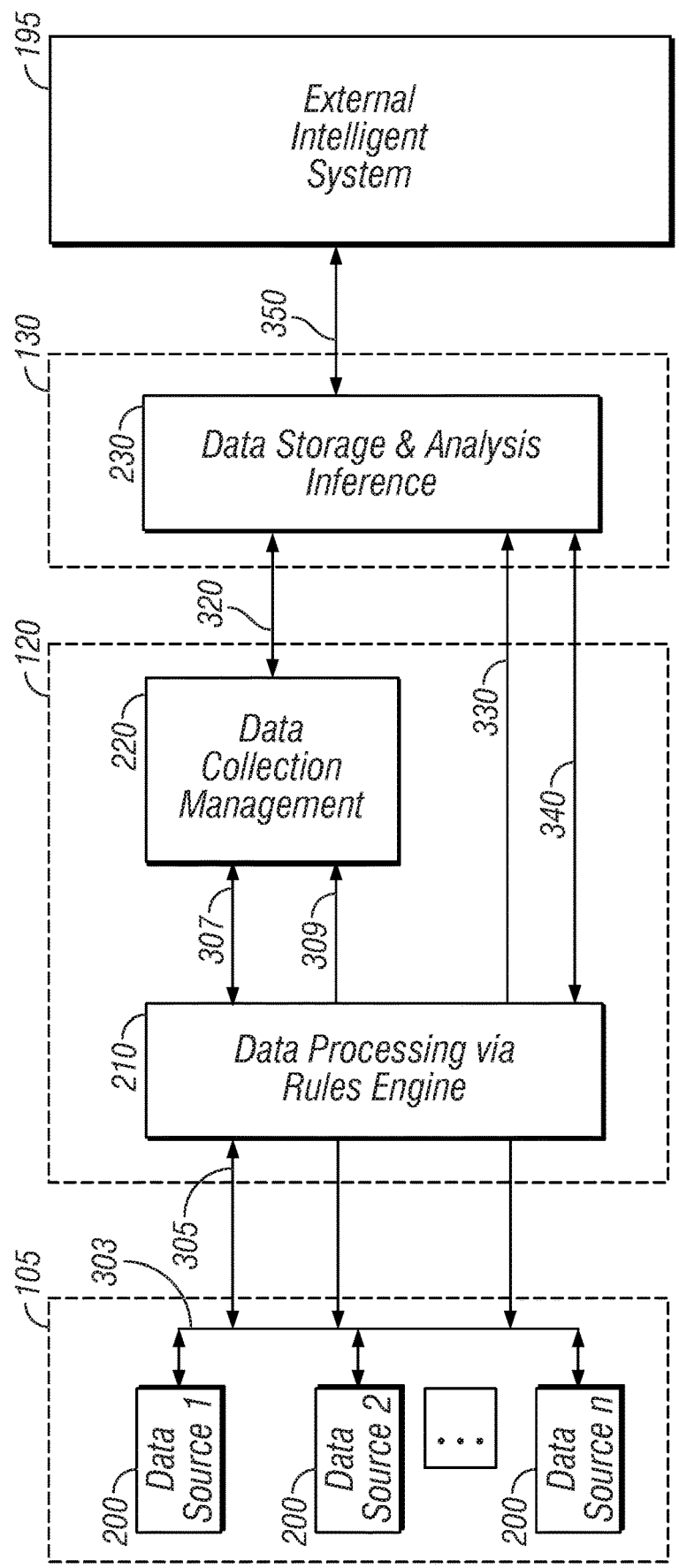
FIG. 6 is a block schematic diagram of a third embodiment of the invention.

FIG. 6 is a diagram of a third embodiment of the invention. A sensor apparatus 105, rules processing management apparatus 120, storage inference apparatus 130 and an external intelligent system 195 are all coupled together. The sensor apparatus includes a plurality dependent or independent sensors 200. The rules processing management apparatus includes the dynamically updateable rules engine 210 and a data collection management module 220. The storage inference apparatus contains a data storage and analysis inference component 230.

Still referring to FIG. 6, in this third embodiment of the invention, the sensor apparatus 105 includes a plurality of dependent or independent sensors 200 connected via a communication network to separate Rules Processing Management Apparatus 120. The Rules Processing Management Apparatus 120 is made up of 1) a dynamically updateable rules engine 210 processing data collected by the sensors and 2) a data collection management module 220 connected via a high speed communication network to a storage inference apparatus 130. The storage inference apparatus 130 is made up of a data storage and analysis inference component 230 that 1) stores and analyses the data being collected by the sensors according to the rules as evaluated by the dynamically updateable rules engine, 2) communicates reflexively to an individual, the system manager, informing current status and/or prompting for manual actions including new rules and/or rule evaluation sequences of existing rules for the dynamic update of the rules engine, and/or infers new actions including new rules and/or new rule evaluation sequences of existing rules such that the new rules or rule sequences may be downloaded and dynamically update the rules engine.

In the third embodiment illustrated in FIG. 6, the elements including dynamically updateable rules engine 210 and Data Collection Management module 220 are included in Rules Processing Management Apparatus 120. Data Storage and Analysis Inference component 230 is included in a separate Storage Inference Apparatus 130. Data Sources 1 to n including a plurality of dependent or independent sensors 200 are part of an independent Sensor Apparatus 105 communicating to Storage Inference Apparatus 120 through a bidirectional communication link and protocol 305 in the manner described for FIG. 5. External Intelligent System 195 is external to Rules Processing Management Apparatus 120 and Storage Inference Apparatus 130 and communicates in the manner described above for FIG. 4.

Bidirectional communication links 320, 330, and 340 may be over a high speed wire including coaxial cable, multi wire such as Ethernet or fiber optics. The communication links 320, 330 and 340 can be wireless including 802.11 (WiFi), 802.15 (5G), or other high speed link protocol.

The bidirectional communication protocol 320, 330, and 340 will be made using protocols such as TCP/IP, UDP, etc. Access to functions between Rules Processing Apparatus 140 and Manage Storage Inference Apparatus 150 will be made in the most efficient manner including Application Programming Interface (API) calls or Web Services and Representation State Transfer (REST) interfaces accessible on the Internet enable access to the External Services and Data by Web applications also located on the Internet. Access to such Web Services can require authorization and authentication.

Figure 7:
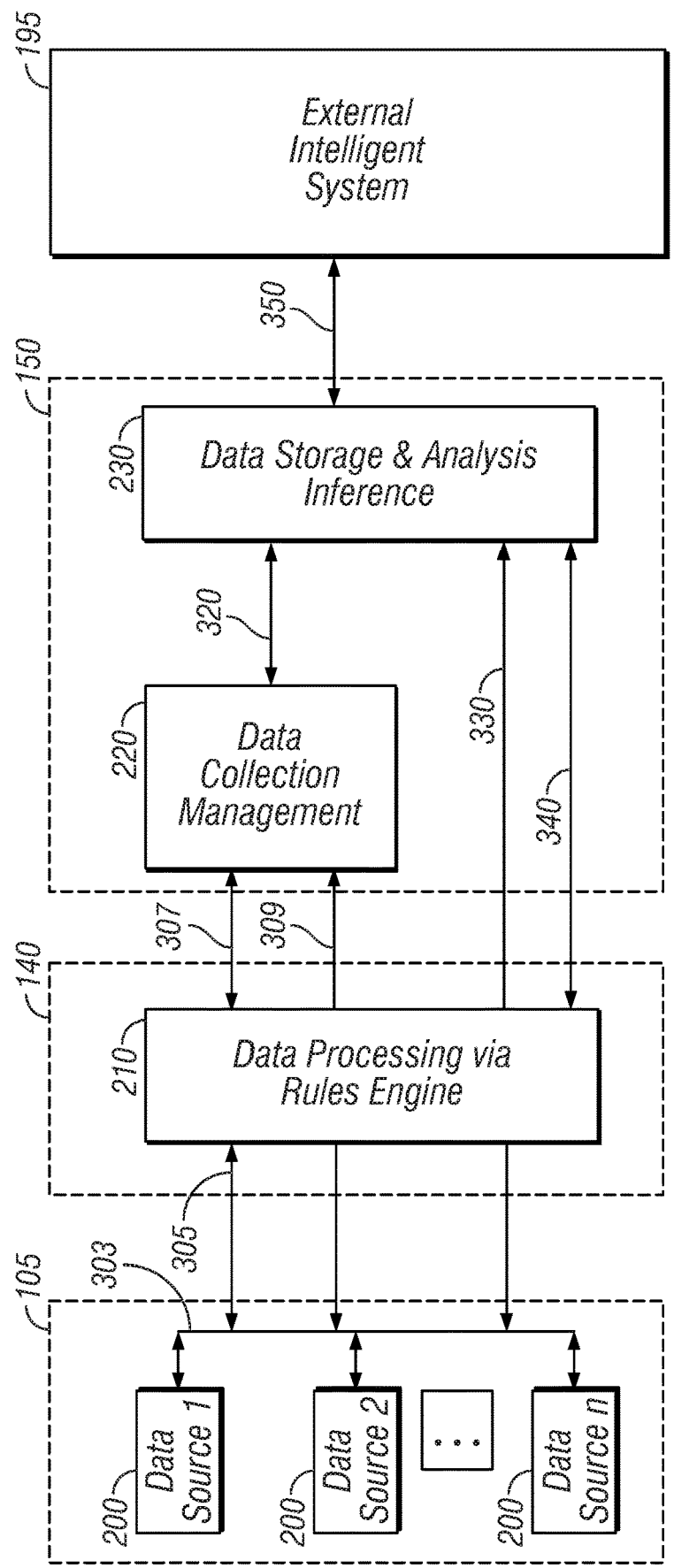
FIG. 7 is a block schematic diagram of a fourth embodiment of the invention.

FIG. 7 is a diagram of a fourth embodiment of the invention. A sensor apparatus 105, rules processing apparatus 140, manage storage inference apparatus 150 and an external intelligent system 195 are all coupled together. The sensor apparatus includes a plurality of dependent or independent sensors 200. The rules processing apparatus includes a dynamically updateable rules engine 210. The manage storage inference apparatus includes a data collection management module 220 and a data storage and analysis inference component 230.

Still referring to FIG. 7, in this fourth embodiment of the invention, the sensor apparatus 105 includes a plurality of dependent or independent sensors 200 connected via a communication network to a separate rules processing apparatus 140. The rules processing apparatus is made up of a dynamically updateable rules engine 210 processing data collected by the sensors connected via a high speed communication network to a management storage inference apparatus 150. The management storage inference apparatus is made up of 1) a data collection management module 220 and 2) a data storage and analysis inference component 230 that a) stores and analyses the data being collected according to the rules as evaluated by the dynamically updateable rules engine, b) communicates reflexively to an individual, the system manager, informing current status and/or prompting for manual actions including new rules and/or rule evaluation sequences of existing rules for the dynamic update of the rules engine, and/or c) infers new actions including new rules and/or new rule evaluation sequences of existing rules such that the new rules or rule sequences may be downloaded and dynamically update the rules engine.

In the fourth embodiment illustrated in FIG. 7, the elements including Data Collection Management module 220 and Data Storage and Analysis Inference component 230 are included in Manage Storage Inference Apparatus 150. Dynamically updateable rules engine 210 is included in a separate Rules Processing Apparatus 140. Data Sources to n include a plurality of dependent or independent sensors 200 are part of independent Sensor Apparatus 105 communicating to Rules Processing Apparatus 140 through a bidirectional communication link and protocol 305 in the manner described for FIG. 5. External Intelligent System 195 is external to Manage Storage Inference Apparatus 150 and communicates in the manner described above for FIG. 4. Dynamically updateable rules engine 210 communicates with Manage Storage Inference Apparatus 150 through bidirectional communication links 307 and 340.

Bidirectional communication links 307 and 340 may be over a high speed wire including coaxial cable, multi wire such as Ethernet or fiber optics. The communication links 307 and 340 can be wireless including 802.11 (WiFi), 802.15 (5G), or other high speed link protocol.

The bidirectional communication protocol for links 307 and 340 can be made using protocols such as TCP/IP, UDP, etc. Access to functions between Rules Processing Apparatus 140 and Manage Storage Inference Apparatus 150 will be made in the most efficient manner including Application Programming Interface (API) calls or Web Services and Representation State Transfer (REST) interfaces accessible on the Internet enable access to the External Services and Data by Web applications also located on the Internet. Access to such Web Services may require authorization and authentication.

Figure 8:
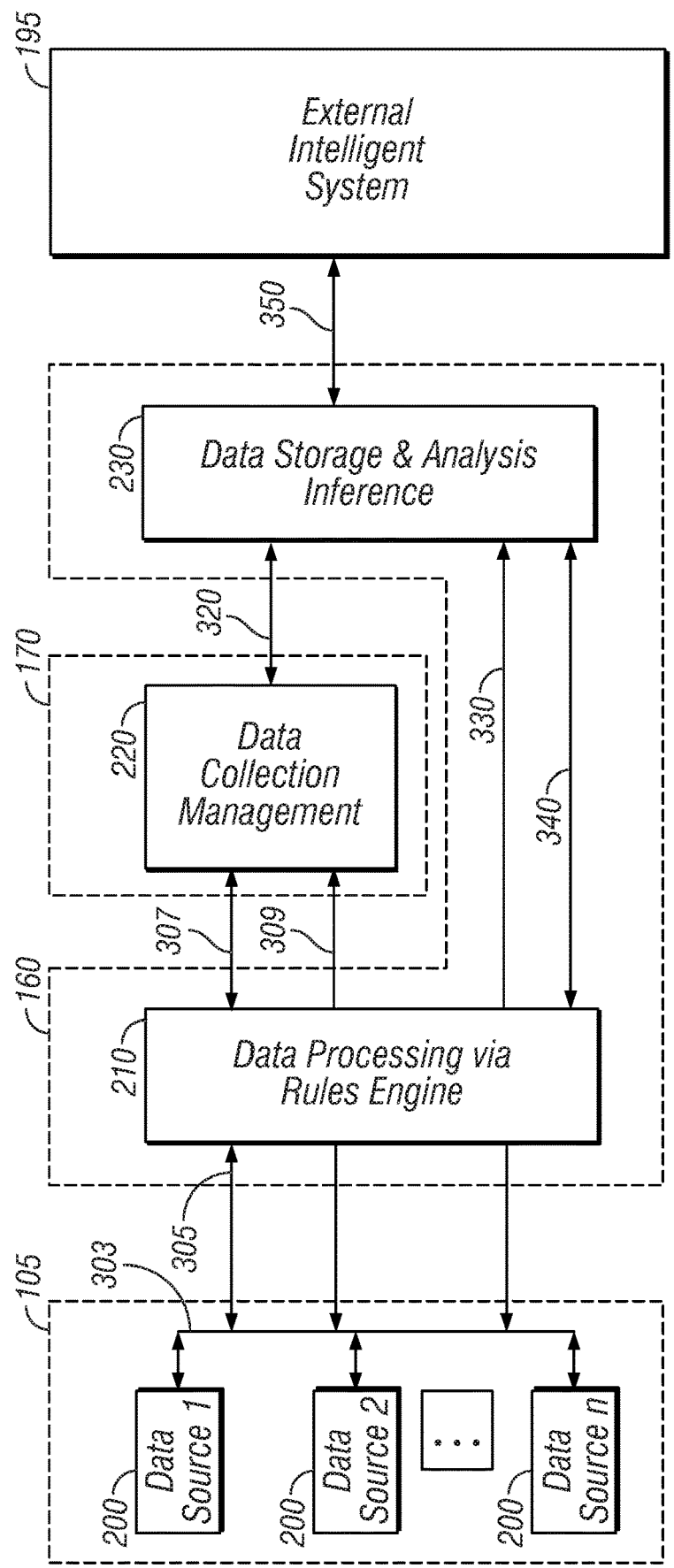
FIG. 8 is a block schematic diagram of a fifth embodiment of the invention.

FIG. 8 is a diagram of a fifth embodiment of the invention. A sensor apparatus 105 rules processing storage inference apparatus 160, management apparatus 170 and an external intelligent system 195 are all coupled together. The sensor apparatus includes a plurality of dependent or independent sensors 200. The rules processing storage inference apparatus includes a dynamically updateable rules engine 210 and a data storage and analysis inference component 230. The management apparatus includes a data collection management module 220.

Still referring to FIG. 8, in this fifth embodiment of the invention, the sensor apparatus 105 includes a plurality of dependent or independent sensors 200 connected via a high speed communication network to a separate rules processing storage inference apparatus 160. The rules processing storage inference apparatus is made up of 1) a dynamically updateable rules engine 210 processing data collected by the sensors and 2) a data storage and analysis inference component 230 that a) stores and analyses the data being collected by the sensors according to the rules as evaluated by the dynamically updateable rules engine, b) communicates reflexively to an individual, the system manager, informing current status and/or prompting for manual actions including new rules and/or rule evaluation sequences of existing rules for the dynamic update of the rules engine, and/or c) infers new actions including new rules and/or new rule evaluation sequences of existing rules such that the new rules or rule sequences may be downloaded and dynamically update the rules engine connected via a communication network to a management apparatus 170. The Management Apparatus is made up of a data collection management module 220 connected via a communication network and protocol to the dynamically updateable rules engine 210 and the data storage and analysis inference component 230.

In the fifth embodiment illustrated in FIG. 8, the elements including dynamically updateable rules engine 210 and Data Storage and Analysis Inference component 230 are included in Rules Processing Storage Inference Apparatus 160. Data collection management module 220 is included in a separate Management Apparatus 170. Again, Data Sources 1 to n include a plurality of dependent and independent sensors 200 that are part of independent Sensor Apparatus 105 communicating to Rules Processing Storage Inference Apparatus 160 through a bidirectional communication link and protocol 305 in the manner described for FIG. 5. External Intelligent System 195 is external to Rules Processing Storage Inference Apparatus 160 and communicates 350 in the manner described above for FIG. 4. Management Apparatus 170 communicates with Rules Processing Storage Inference Apparatus 160 through bidirectional communication links 307 and 320.

Bidirectional communication links 307 and 320 may be over a high speed wire including coaxial cable, multi wire such as Ethernet or fiber optics. Communication links 307 and 320 could be wireless including 802.11 (WiFi), 802.15 (5G), or other high speed link protocol.

The bidirectional communication protocol 307 and 320 can be made using protocols such as TCP/IP, UDP, etc. Access to functions between Rules Processing Storage Inference Apparatus 160 and Management Apparatus 170 will be made in the most efficient manner including Application Programming Interface (API) calls or Web Services and Representation State Transfer (REST) interfaces accessible on the Internet enable access to the External Services and Data by Web applications also located on the Internet. Access to such Web Services can require both authorization and authentication.

Figure 9:
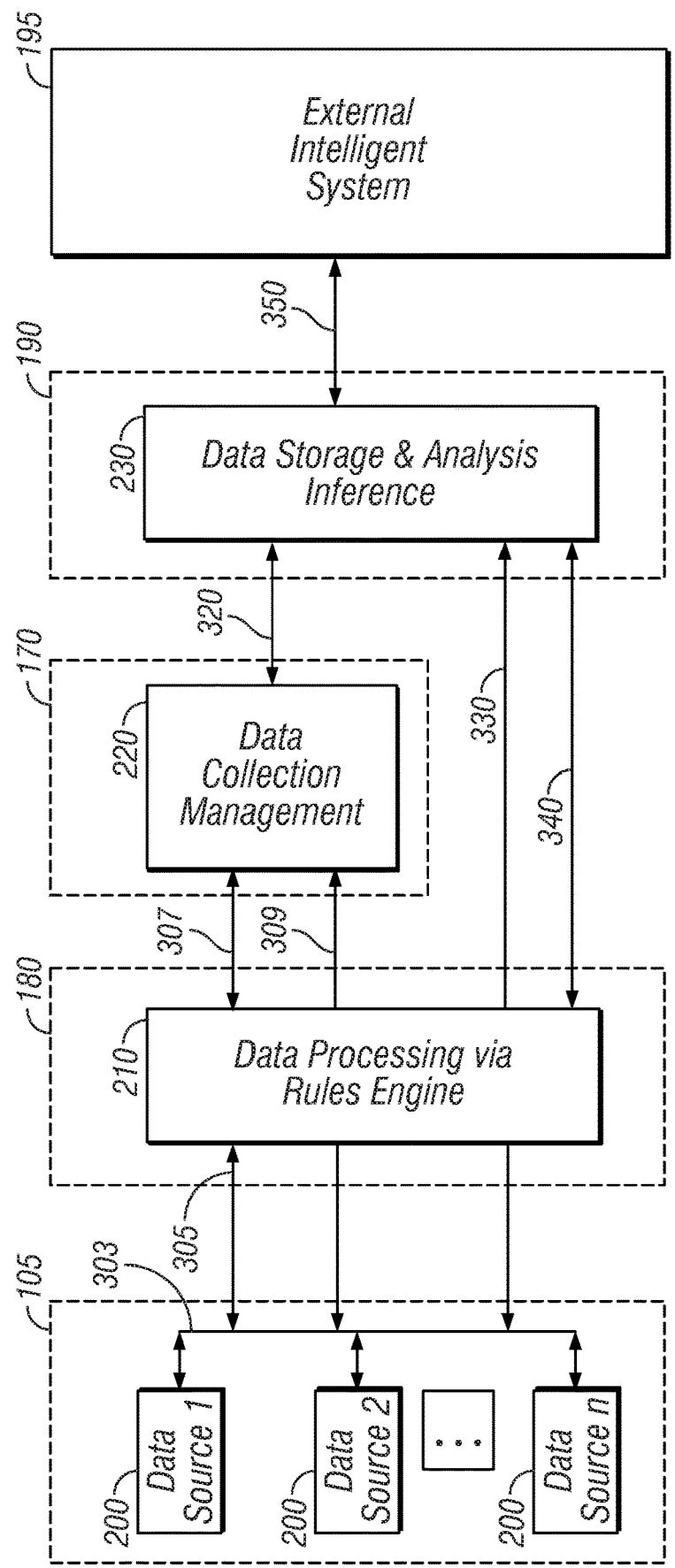
FIG. 9 is a block schematic diagram of a sixth embodiment of the invention.

FIG. 9 is a diagram of a sixth embodiment of the invention. A sensor apparatus 105, a rules processing apparatus 180, a management apparatus 170, a storage inference apparatus 190 and an external intelligent system 195 are all coupled together. The sensor apparatus includes a plurality of dependent or independent sensors 200. The rules processing apparatus includes a dynamically updateable rules engine 210. The management apparatus contains a data collection management module 220. The storage inference apparatus includes a data storage and analysis inference component 230.

Still referring to FIG. 9, in this sixth embodiment of the invention, the sensor apparatus 105 includes a plurality of dependent or independent sensors 200 connected via a high speed communication network to separate rules processing apparatus 180. The rules processing apparatus is made up of a dynamically updateable rules engine 210 processing data collected by the sensors connected via a communication network to a management apparatus 170. The management apparatus is made up of a data collection management module 220 connected via a communication network to a separate storage inference apparatus 190. The storage inference apparatus 190 is made up of a data storage and analysis inference component 230 that 1) stores and analyses the data being collected by the sensors according to the rules as evaluated by the dynamically updateable rules engine, 2) communicates reflexively to an individual, the system manager, informing current status and/or prompting for manual actions including new rules and/or rule evaluation sequences of existing rules for the dynamic update of the rules engine, and/or 3) infers new actions including new rules and/or new rule evaluation sequences of existing rules such that the new rules or rule sequences may be downloaded and dynamically update the rules engine.

In the sixth embodiment illustrated in FIG. 9, dynamically updateable rules engine 210 is included in separate Rules Processing Apparatus 180. Data collection management module 220 is included in a separate Management Apparatus 170. Data Storage and Analysis Inference component 230 is included in a separate Storage Inference Apparatus 190. Data Sources 1 to n including a plurality of dependent and independent sensors 200 are part of independent Sensor Apparatus 105 communicating to Rules Processing Apparatus 180 through a bidirectional communication link and protocol 305 in the manner described for FIG. 5. External Intelligent System 195 is external to Storage Inference Apparatus 190 and communicates 350 in the manner described above for FIG. 4. Rules Processing Apparatus 180 communicates with Management Apparatus 170 through bidirectional communication link 307 and with Storage Inference Apparatus 190 through bidirectional link 340. Management Apparatus 170 communicates to Storage Inference Apparatus 190 through bidirectional link 320. Bidirectional links 330 and 340 communicate in the manner described in FIG. 6. Bidirectional links 307 and 320 communicate in the manner described in FIG. 8.

A practical application of an embodiment of the present disclosure that has value within the technological arts is controlling a system that is subject to varying operating conditions. Further, an embodiment of the present disclosure is useful in conjunction with operating a server farm that is experiencing fluctuating loads, or in conjunction with operating a large truck that is crossing a mountain range. There are virtually innumerable uses for embodiments of the present disclosure, all of which need not be detailed here.

The above embodiments are only illustrative of the principles of this invention and are not intended to limit the invention to the particular embodiments described. One skilled in the art should recognize that services described may be deployed using one or more servers, on user devices, and in combination with other system components. In particular, it is contemplated that functional implementation of the invention described herein may be implemented equivalently in hardware, software, firmware, and/or other available functional components or building blocks. Accordingly, various modifications, adaptations, and combinations of various features of the described embodiments can be practiced without departing from the scope of the invention as set forth in the appended claims.

The appended claims are not to be interpreted as including means-plus-function limitations, unless such a limitation is explicitly recited in a given claim using the phrase(s) "means for" or "mechanism for" or "step for". Sub-generic embodiments of this disclosure are delineated by the appended independent claims and their equivalents. Specific embodiments of this disclosure are differentiated by the appended dependent claims and their equivalents.

What is claimed is:

1. An apparatus for controlling operation of a coupled, external machine, comprising:
   plurality of sensors adapted to monitor operations of the external machine and provide sensor data related to conditions and events sensed by the sensors;
   a dynamically updateable rules engine coupled, through execution by a processor, to the plurality of sensors, the dynamically updateable rules engine comprising an optimized rules execution structure optimized using complexity ordered groupings of the sensor data;
   a data collection management module coupled to the dynamically updateable rules engine and, through execution by the processor, the plurality of sensors;
   a data storage and analysis inference module coupled to the data collection management module, the dynamically updateable rules engine and, through execution by the processor, the plurality of sensors;
   the processor adapted for selectively executing the optimized rules execution structure based on the conditions and events;
   the processor adapted to update the dynamically updateable rules engine using the data storage and analysis inference module; and
   the processor adapted to provide an adjustable control signal to the external machine, according to the selective execution of the optimized rules execution structure, to direct actions of the external machine.

2. The apparatus of claim 1, wherein the optimized rules execution structure comprises a rules engine logic circuit that includes a hardware description language prioritized evaluation tree.

3. The apparatus of claim 2, wherein the hardware description language prioritized evaluation tree comprises complexity ordered groupings of n-tuples of fields with the same complexity.

4. The apparatus of claim 1, wherein the dynamically updateable rules engine comprises a sensor controller.

5. The apparatus of claim 1, wherein the dynamically updateable rules engine comprises a memory comprising a compiled binary prioritized evaluation tree.

6. The apparatus of claim 1, wherein the dynamically updateable rules engine comprises a storage controller.

7. The apparatus of claim 6, wherein the dynamically updateable rules engine comprises a storage device coupled to the storage controller.

8. The apparatus of claim 1, further comprising an external intelligent system coupled to the data storage and analysis inference module, comprising additional processing capacity.

9. The apparatus of claim 8, wherein the data storage and analysis inference module updates the dynamically updateable rules engine with new rules from the external intelligent system.

10. The apparatus of claim 1, wherein the apparatus is a lathe, the sensors are rotational speed sensors, and the conditions and events comprise a speed of rotation of the lathe.

11. The apparatus of claim 1, wherein the apparatus is a highway metering apparatus, the sensors are vehicle speed and weight sensors, and the conditions and events comprise speeds and weights of vehicles entering, traversing, and exiting a segment of a highway.

12. An apparatus coupled to an external machine, the apparatus, comprising:
   a plurality of sensors configured to monitor operations of the external machine and provide data related to conditions and events sensed by the plurality of sensors;
   a dynamically updateable rules engine coupled, through execution by a processor, to the plurality of sensors, the dynamically updateable rules engine comprising an optimized rules execution structure optimized using complexity ordered groupings of the sensor data;
   a data collection management module coupled to the dynamically updateable rules engine and, through execution by the processor, the plurality of sensors;
   a data storage and analysis inference module coupled to the data collection management module, the dynamically updateable rules engine, and, through execution by the processor, the plurality of sensors;
   the processor adapted to selectively execute the optimized execution structure based on the conditions and events;
   the processor adapted to update the dynamically updateable rules engine using the data storage and analysis inference module; and
   the processor adapted to provide an adjustable control signal to the external machine, according to the selective execution of the optimized rules execution structure, to direct actions of the external machine.

13. A computer-implemented method for controlling an external machine through operation of a sensor system, the method comprising:
   a processor receiving sensor data from a plurality of sensors using a dynamically updateable rules engine that is coupled to the plurality of sensors, the sensor data related to conditions and events during operations of the external machine, the dynamically updatable rules engine comprising an optimized rules execution structure optimized using complexity ordered groupings of the sensor data;
   processing the received sensor data using the dynamically updateable rules engine by selectively executing the optimized rules execution structure based on conditions and events;
   transmitting the processed sensor data from the dynamically updateable rules engine to a data collection management component that is coupled to the dynamically updateable rules engine and the plurality of sensors;
   updating dynamically the dynamically updateable rules engine using a data storage and analysis inference module that is coupled to the dynamically updateable rules engine, the dynamically updateable rules engine and the plurality of sensors; and
   adjusting an operation of the external machine and operations of the plurality of sensors based on the selective execution of the optimized rules execution structure to direct actions of the external machine and actions of the plurality of sensors.

14. The method of claim 13, wherein the dynamically updateable rules engine comprises a rules engine logic circuit comprising a hardware description language prioritized evaluation tree.

15. The method of claim 14, wherein the hardware description language prioritized evaluation tree comprises complexity ordered groupings of n-tuples of fields with the same complexity.

16. The method of claim 14, further comprising modifying the hardware description language prioritized evaluation tree to remove non-relevant and low priority rules.

17. The method of claim 14, further comprising:
   applying highest priority rules ahead of applying lower priority rules; and adjusting operation of the external machine based only on a subset of the highest priority rules.

18. The method of claim 13, wherein the dynamically updateable rules engine comprises a memory that includes a compiled binary prioritized evaluation tree.

19. The method of claim 13, wherein updating dynamically the dynamically updateable rules engine using the data storage and analysis inference module comprises receiving new rules from an external intelligent system that is coupled to the data storage and analysis inference module.

20. A non-transitory computer readable media comprising executable programming instructions That, when executed by a processor, cause the processor, in communication with an external machine, to:

receive sensor data from a plurality of sensors using a dynamically updateable rules engine that is coupled to the plurality of sensors, the sensor data related to conditions and events during operations of the external machine, the dynamically updatable rules engine comprising an optimized rules execution structure optimized using complexity ordered groupings of the sensor data;

process the received sensor data using the dynamically updateable rules engine by selectively executing the optimized rules execution structure based on conditions and events;

transmit the processed sensor data from the dynamically updateable rules engine to a data collection management component that is coupled to the dynamically updateable rules engine and the plurality of sensors;

update dynamically the dynamically updateable rules engine using a data storage and analysis inference module that is coupled to the dynamically updateable rules engine, the dynamically updateable rules engine and the plurality of sensors; and adjust an operation of the external machine and operations of the plurality of sensors, based on the selective execution of the optimized execution structure, to direct actions of the external machine and actions of the plurality of sensors.

* * * * *